(12) United States Patent
Combs et al.

(10) Patent No.: US 10,061,932 B1
(45) Date of Patent: Aug. 28, 2018

(54) SECURING PORTABLE DATA ELEMENTS BETWEEN CONTAINERS IN INSECURE SHARED MEMORY SPACE

(71) Applicant: WindTalker, LLC, Roswell, GA (US)

(72) Inventors: Christopher Combs, Gainesville, GA (US); Michael Lester, Miami, FL (US)

(73) Assignee: WindTalker, LLC, Roswell, GA (US)

( * ) Notice: Subject to any disclaimer, the term of this patent is extended or adjusted under 35 U.S.C. 154(b) by 0 days.

(21) Appl. No.: 15/861,671

(22) Filed: Jan. 4, 2018

(51) Int. Cl.
| | |
|---|---|
| *G06F 11/30* | (2006.01) |
| *G06F 21/60* | (2013.01) |
| *H04L 9/06* | (2006.01) |
| *H04L 9/14* | (2006.01) |
| *H04L 9/32* | (2006.01) |
| *G06F 3/12* | (2006.01) |
| *H04N 1/44* | (2006.01) |
| *H04L 9/30* | (2006.01) |

(52) U.S. Cl.
CPC .......... *G06F 21/608* (2013.01); *G06F 3/1222* (2013.01); *G06F 3/1238* (2013.01); *G06F 3/1288* (2013.01); *G06F 21/602* (2013.01); *H04L 9/0631* (2013.01); *H04L 9/0643* (2013.01); *H04L 9/14* (2013.01); *H04L 9/30* (2013.01); *H04L 9/3226* (2013.01); *H04N 1/4486* (2013.01); *H04N 2201/0082* (2013.01)

(58) Field of Classification Search
CPC . H04L 9/14; H04L 9/30; H04L 9/3247; G06F 21/60; G06F 21/572; G06F 21/602; G06F 21/78; G06F 21/72; G06F 21/10
USPC .................................................. 713/189, 193
See application file for complete search history.

(56) References Cited

U.S. PATENT DOCUMENTS

| | | | | |
|---|---|---|---|---|
| 9,703,981 B1* | 7/2017 | Marion | ............... | G06F 21/6227 |
| 9,705,854 B2* | 7/2017 | Khazan | ................ | H04L 63/061 |
| 2014/0010371 A1* | 1/2014 | Khazan | ................ | G06F 21/602 |
| | | | | 380/278 |
| 2014/0082749 A1* | 3/2014 | Holland | ............... | G06F 21/645 |
| | | | | 726/29 |
| 2015/0082050 A1* | 3/2015 | Roullier | ................ | G06F 21/60 |
| | | | | 713/189 |
| 2017/0093567 A1* | 3/2017 | Gopal | ................... | H04L 9/0861 |
| 2018/0075262 A1* | 3/2018 | Auh | ........................ | G06F 21/78 |

* cited by examiner

*Primary Examiner* — Samson Lemma

(57) ABSTRACT

Systems and methods for encrypting an unencrypted data set within a file are provided. The disclosed systems and methods can be configured to create a ciphertext object within the existing data structures of a native file format. The systems and methods enable the secure copying data between multiple applications while displaying a revealed form of the data to a user.

28 Claims, 9 Drawing Sheets

Acme Widget Company

This ▒▒▒▒ report for the Acme Widget Company. This report is completely fake but removing some of the information should be a lot of fun.

Here are some fake social security numbers to demonstrate how scouts can be used: ▒▒▒▒▒▒▒▒▒▒ ▒▒▒▒▒▒▒▒▒▒, ▒▒▒▒▒▒▒▒▒▒ as well as 768-6543.

In case we want to make sure they are found in any position]

▒▒▒▒▒▒▒▒ ▒▒▒▒▒▒▒▒

And then here are some phone numbers we can use (▒▒▒) 222-4432, (445) 4▒▒-7778 or (999) 999-▒▒▒▒.

And even (555) ▒▒▒-8765 just to put it in the middle of a sentence,

This is another sentence that can be used to show redaction.

SECURING PORTABLE DATA ELEMENTS BETWEEN CONTAINERS IN INSECURE SHARED MEMORY SPACE

FIELD OF THE INVENTION

The present invention relates generally to managing encryption of data elements or portions of files, and more particularly to securely copying data between multiple applications through insecure memory space while displaying a revealed form of the data to a user.

BACKGROUND OF THE INVENTION

The need to protect sensitive data often limits an organization's ability to adopt collaborative practices. Without secure and sanctioned means of collaborating, individuals often create potential breach and non-compliance litigation risks by finding their own solutions. Meanwhile, allowing all users to see the entire body of information is neither appropriate nor necessary for them to fulfill their specific roles. Existing systems typically provide mechanisms for protection that are either based on tightening network security, which inhibits collaboration, or on multiple versions of the same document, which creates confusion and increases costs and risks of disclosure.

Known techniques for sharing secure information include creating multiple manually-redacted files, with each version of the file having different portions redacted depending on the security clearance level of the intended recipients. These techniques are manually intensive and prone to error.

Existing methods of encrypting documents typically operate by encrypting relatively large logical and physical structures. For example, whole disk encryption encrypts an entire storage device. Many tools also exist for encrypting whole files. Such techniques include the encryption schemes built into various versions of the Windows™ operations system, as well as third party tools such as Pretty Good Privacy™ and various compression tools. The primary limitation of these tools is that the entire document or physical device must be encrypted and decrypted as a whole. Using these tools, it is not possible to encrypt only a portion of, for example, a word processing document.

While techniques are known for manually encrypting portions of documents, there does not exist any tool for automatically managing partial file encryption in a way that preserves document integrity through format changes and scales at the enterprise level, and further allowing the secure copying of revealed data through non-protected shared system memory space.

BRIEF DESCRIPTION OF THE DRAWINGS

FIG. 2 illustrates an example data structure for a ciphertext object.

FIG. 7 illustrates an example user interface for identifying unencrypted data sets for encryption.

DETAILED DESCRIPTION

Figure 1:
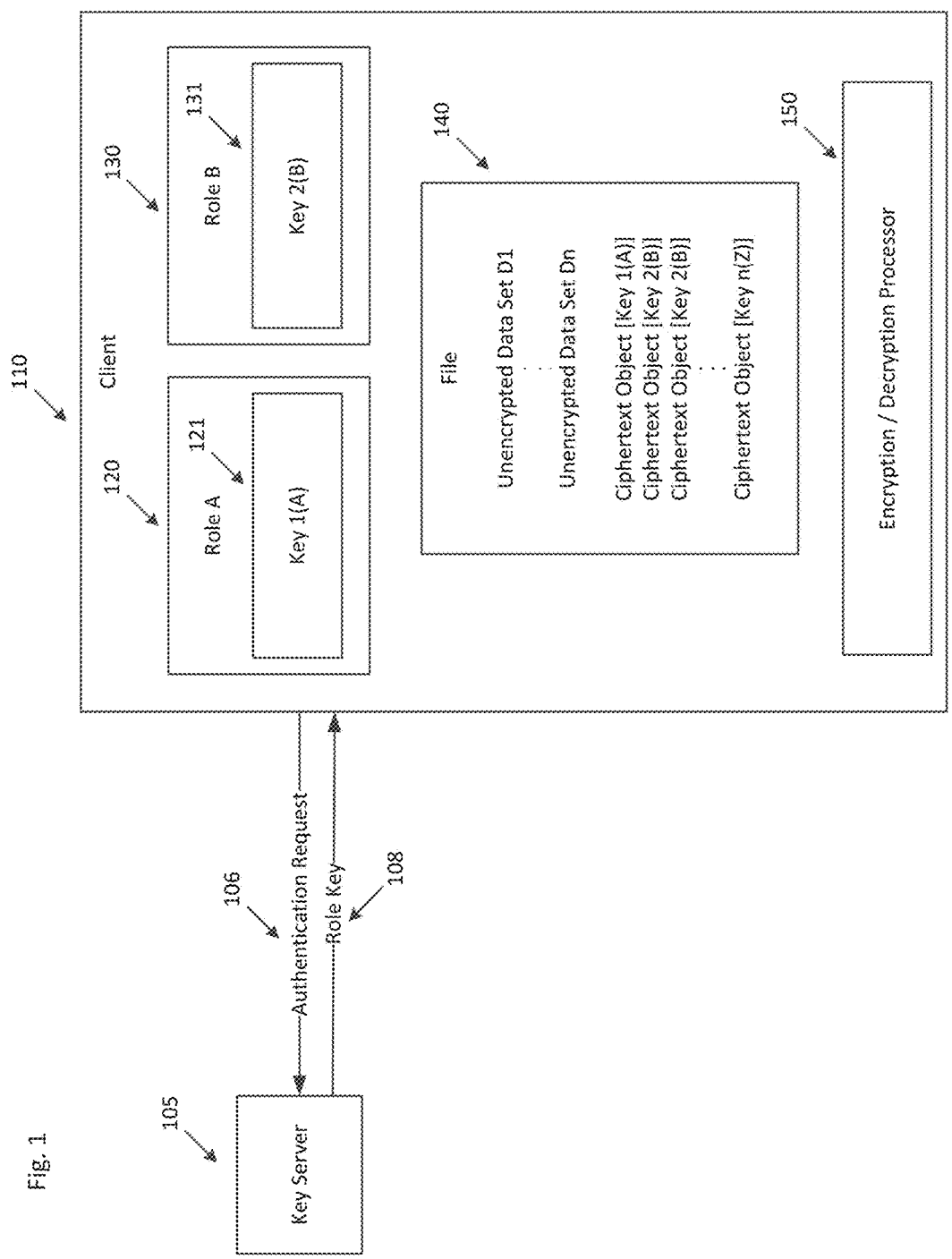
FIG. 1 illustrates an example system architecture for encryption and decryption.

In the following description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases the ordering may be changed so that certain inputs are provided at different times or in a different order without changing the function of the systems and methods described. The setup, encryption, key administration, and decryption procedures could also be executed in different orders. Additionally, various computations that are described below, such as those within the setup, encryption, key administration, and decryption modules, need not be performed in the order disclosed, and other embodiments using alternative orderings of the computations could be readily implemented. In addition to being reordered, the computations could also be decomposed into sub-computations with the same results.

The systems and methods described herein can be used to facilitate sharing of information with users who have varying levels of security clearance or permissions within a single file or container. As a result, storage needs can be dramatically reduced. The systems and methods described herein do not require encrypting an entire file or directory of files. Rather, protection can be applied specifically to the unencrypted data sets within a file that are sensitive and designated for protection. The systems and methods described herein are independent of the computing device on which the file is opened or otherwise accessed. Any authorized user can access data on an authenticated device. As a result, if, for example, a mobile device is lost, security will not be compromised. These characteristics may be relevant in the context of Bring Your Own Device (BYOD) environments.

The systems and methods described herein can be used to encrypt and decrypt information at multiple levels of abstraction, from individual data elements in a file, such as a character, to the whole file level. To the extent that a storage device is represented as a logical file, storage devices could also be encrypted using the systems and methods described herein. The protection can be applied to a selected unencrypted data set at the time the unencrypted data set is created or at any time thereafter. In some embodiments, the protection applied can be managed by defining information classifications. Information classification can define or be based on a roles and encryption profiles within an enterprise and then assigning permissions, and corresponding roles, to users accordingly. As used herein, an encryption profile, described in more detail below, can define an information classification, which can be related to the role of users within an organization for a user.

The systems and methods described herein can be implemented using a client-server model. The systems and methods can be configured to operate on any form of unencrypted data set, such as portions of a document, an entire document, or any data stream of any type. As used herein, an unencrypted data set can be any portion of data in any form stored on or capable of being stored on any computerized storage device. As non-limiting examples, an unencrypted data set can be one or more alphanumeric characters, a portion of image data, an audio track in a video file, and so on. Unencrypted data sets can also be formed as logical or physical data containers, such as complete files, portions or parts of files, such as MS-Word™, spreadsheets, or Adobe Acrobat™ files. Unencrypted data sets can also be formed into portions or parts of a data stream, such as in a video file. As non-limiting examples, the data stream can be a typical computer memory stream, or can be light pulses or even atomic movement. As new methods of transmitting and securing data are utilized, the systems and methods described herein can be implemented on those data transmission systems in the same or a similar manner as other existing network transmission protocols. As used herein, data containers can be files, such as as documents and the terms file and documents are used interchangeably. Unencrypted data sets can be encrypted using any available cryptographic technique, as described in more detail below.

Secure File Data Structures

The systems and methods described herein can be configured to create a secure environment in which information can be accessed, modified, and saved. An example of the system architecture for encryption and decryption is illustrated in FIG. 1. The system can comprise at least one client (110) and at least one key server (105). The client can be configured to perform various functions on unencrypted data sets and encrypted ciphertext objects in files which may be stored locally at the client or stored remotely. The client software can be configured to execute as a stand-alone application or as a plug-in module for any existing application. Non-limiting examples of applications for which a plug-in module could be used include MS-Word™ and Adobe Acrobat™.

The systems and methods described herein can be configured to encrypt data within a native file format. A file (140) that is processed by the disclosed systems and methods may be fully compatible with the application that created the files. As a result, the files can be opened and the unencrypted portions read by a user without the user possessing or executing any additional client software. This enhanced functionality is a result of the data structures created and used by the client software. As illustrated in FIG. 1, the file (140) can include one or more unencrypted data sets (D1 . . . Dn) and multiple ciphertext objects. The ciphertext objects can be encrypted by the user according to any of the role keys available at the client.

The systems and methods described herein can encrypt an unencrypted data set within a file and store the encrypted data as a ciphertext object. The ciphertext object can be created by encrypting an identified unencrypted data set. The ciphertext object is a portable data structure that can be preserved and copied between and/or associated with different files of the same or different formats.

The unencrypted data set to be encrypted may have been identified using any one or more of the identification methods described below. The encryption of the unencrypted data set can be performed according to any computable encryption algorithm. In some embodiments, AES-256 can be used as a default algorithm. As non-limiting examples, any other encryption algorithm, such as 3DES, TwoFish, Blowfish and Serpent, can be provided as options. In some embodiments, both public key and/or private key cryptography can be used. As described in more detail below, any installed algorithm can be assigned for use in connection with a given information classification or role key.

Various cryptographic libraries can be used as options, including Microsoft Windows Certified Next Generation Encryption Library (Windows CNG), the Java Bouncy Castle encryption library, and the Android Spongy Castle instantiation of Bouncy Castle. Additional algorithms can be provided through a plug-in, library, application programming interface, or other technique. In some embodiments, the ciphertext object does not store any information usable to identify or determine the cryptographic algorithm used to encrypt.

The command to encrypt an unencrypted data set within a file can be given using the interface described in more detail below. According to the encrypt command, the unencrypted data set is then encrypted using the configured cryptographic algorithm and the resulting ciphertext is stored as a ciphertext object. The ciphertext object can then be stored in or with the file as a discrete data object.

In some cases, the native file format specified by the publisher of the host application may use an Extensible Markup Language (XML) schema. For example, some versions of Microsoft Word™ use the Office Open XML schema whereby a document is stored in multiple parts and compressed in a ZIP file. An item embedded in the file, such as a picture, may be stored as binary encoded blocks within the XML. The ciphertext object can be stored as data within an appropriate XML data structure, forming a component of the file. The ciphertext object can be represented in byte form and/or in string form to facilitate data stream or ANSI inclusion across different file formats.

The ciphertext object can be stored as a component of the file or it can be stored separately. The ciphertext object can be stored in a separate physical data storage device and then logically linked to the associated file. Other variations are possible so long as the computing device and host application loading the file can locate and retrieve the associated ciphertext object. The ciphertext object data itself could be stored in accordance with an XML schema or it could be stored as a serial data stream with predetermined delimiters. In some embodiments, the ciphertext object can encapsulate information about the ciphertext and the plaintext data in an XML schema, as described below. This information may be used when the ciphertext object is copied to different files as a portable ciphertext object. Other encapsulation schemes could be used and other variations are possible.

As described herein, the ciphertext object can include several associated descriptive attributes, in addition to the encrypted ciphertext. The descriptive attributes of the ciphertext object can be stored with the ciphertext object or separately from the ciphertext object and logically linked to the ciphertext object. In some embodiments, as non-limiting examples, the attributes can include: an identification of where in the file a particular encryption (and corresponding redaction) was performed; an identification of the type of unencrypted data set that was encrypted (e.g., string, integer, boolean, image, etc.); an indication (e.g., code, counter, link, etc.) of where in the file a certain replacement item should be represented; and/or an indication of the type of replacement item and/or predetermined content that is to be used to replace the original unencrypted data set.

As further non-limiting examples, the ciphertext object can contain descriptive attributes that identify the owner or creator of the ciphertext object. In some embodiments, the owner or creator can be a user with an account on a key management server and/or a user who has been assigned a role, as described in more detail below. The descriptive attributes can be configured to provide a unique or substantially unique identifier. The identifier can be used to track individual ciphertext objects through electronic file stores. For example, an administrative interface could be provided that would receive as input a unique or substantially unique ciphertext object identifier, execute a search query based on that identifier for files that include the corresponding ciphertext object, and then display the search results.

In some embodiments, the descriptive attributes can be configured to identify a user who has performed an encryption or a decryption operation on the ciphertext object. Given that encryption and decryption functions can be performed within the secure environment using keys provided to authenticated users, encryption and decryption operations can be associated with the user performing these functions, and this associated user information can be stored as a descriptive attribute.

In some embodiments, the descriptive attributes can be configured to contain information that can be used to restrict the ability of a user to remove the encryption on a ciphertext object. The attribute can define any combination of specifically identified users, users in certain roles, or all users universally. The restrictive attribute can be defined as a whitelist or a blacklist.

In some embodiments, the descriptive attributes can be configured to contain information that identifies a parent of the ciphertext object through the use of hierarchical keys. This relationship information can be used for tracking ciphertext object movement among different files. This relationship also allows supervisory access to child ciphertext objects by granting access to subordinate roles. For example, a call center employee could be placed in a role that shares a parent relationship with individual customer roles. In such a scheme, a customer would have a defined role, and that customer may be the only member in that role. The call center employee could gain access to information encrypted by a customer's role key without being a member of the individual customer's role directly, since the customer's role is a subordinate role to the call center employee's role. Further parent relationships could be established for call center supervisors that would be superior to the call center employee's role.

FIG. 2 illustrates an example XML encapsulation used to describe a ciphertext object in a file. The ciphertext object encoded in XML can include one or more pre-determined fields. As non-limiting examples, the XML schema can include fields for name, unique identifier, location, and ciphertext. Numerous other fields could be used as appropriate, in addition to or instead of those described above. As non-limiting examples, the ciphertext object can include other or additional parameters, such as packet version, role key unique identifier, role key version unique identifier, salt, initialization vector, and hash-based message authentication code (HMAC).

In some embodiments, all or substantially all of the descriptive attributes and other data associated with the ciphertext objects in a file can be encrypted using an additional key that is different from the key used to encrypt the unencrypted data set itself. As a non-limiting example, the additional key used for this purpose could be another role key or a separate key designated for this purpose. This capability can be used to further obfuscate the ciphertext contained in a file, creating an additional layer of security.

Figure 3:
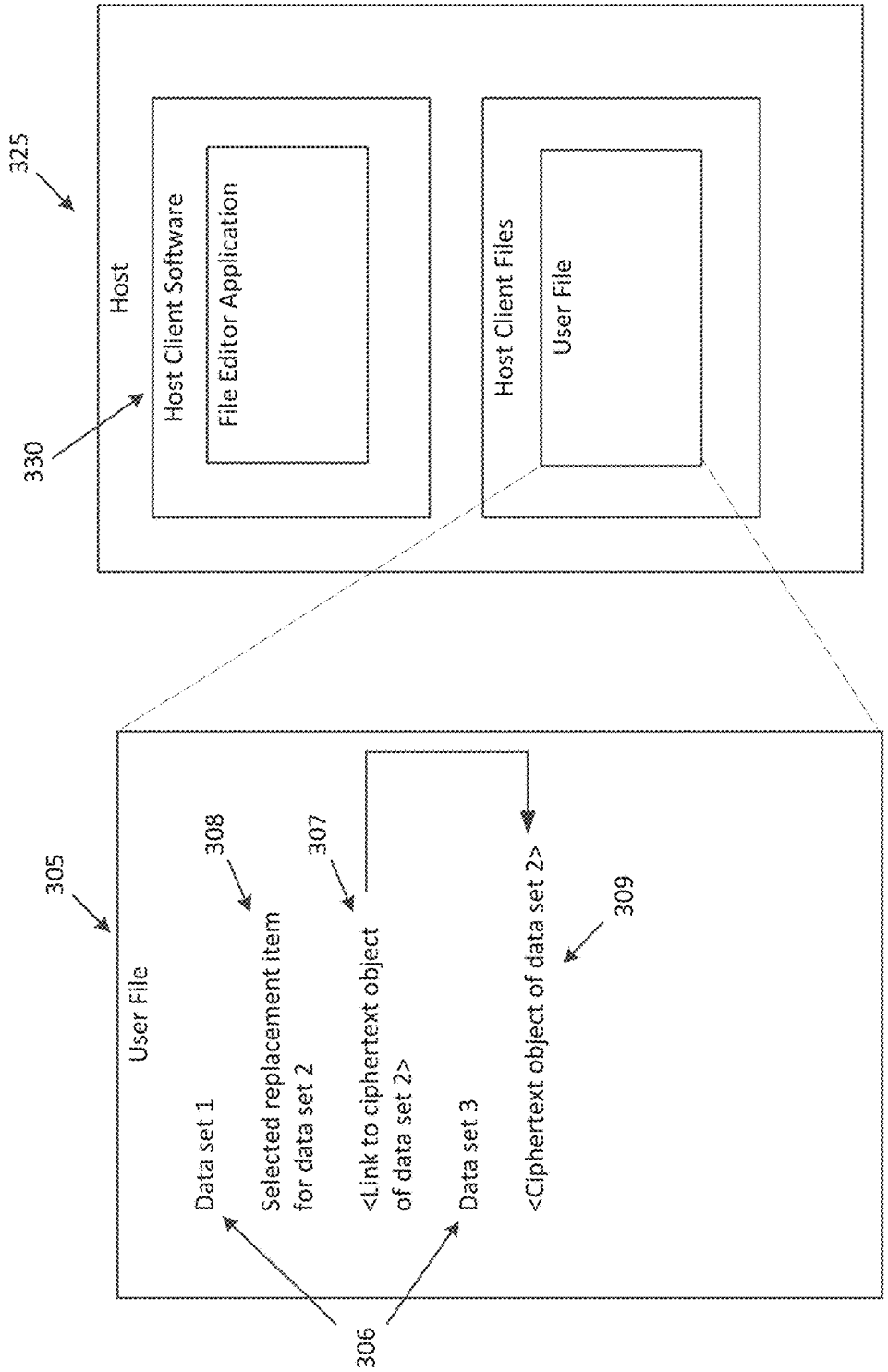
FIG. 3 illustrates example user file components.

As a non-limiting example, as illustrated in FIG. 3, the encryption process can create a file (305) on a host computing device (325) that has unencrypted data sets (306) between which a link (307) to a ciphertext object is located. A link to the ciphertext object can be to a logical location and/or to a physical storage location. The link to the ciphertext object can be stored in the user file at or proximate to the location where the unencrypted data set formerly was stored. In this example, the link to the ciphertext object of unencrypted data set 2 is stored in the file between unencrypted data sets 1 and 3.

The location at which the ciphertext object is stored may be part of the user file (305), may be a separate and independently created file, or may be part of another file. A selected replacement item (308) for the former unencrypted data set can be stored in the file (305) at the location where the plaintext data was previously located before it was encrypted. Alternatively, the replacement item could be stored at the linked location with the ciphertext object. The ciphertext object attributes described above can also be stored at the location where the encrypted data set is located (309). The replacement item can be displayed to a user by the host client software (330) in the location where the plaintext data was formerly located.

Figure 4:
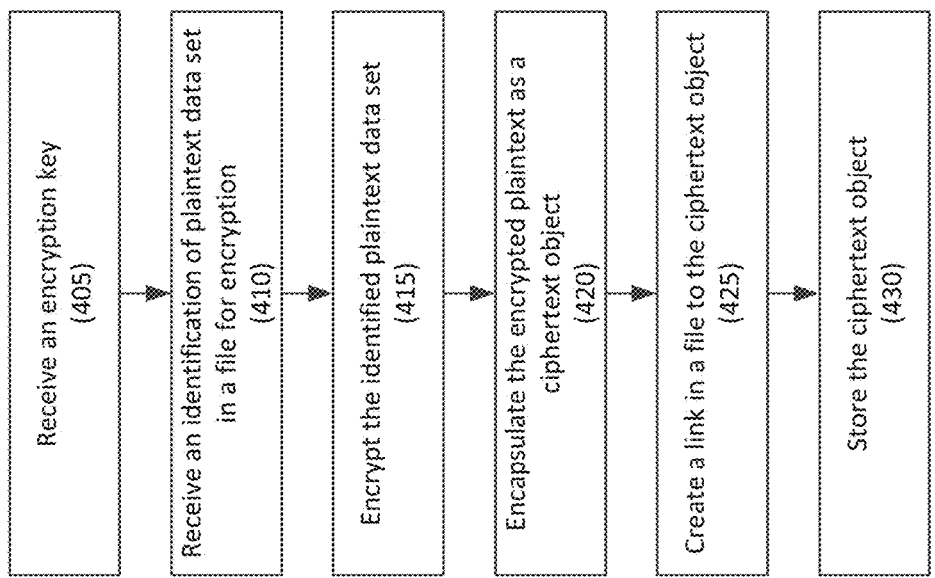
FIG. 4 illustrates an example method for encryption.

A non-limiting example method for creating a ciphertext is illustrated in FIG. 4. In this example, the client receives an encryption key (405) from the key server. As described herein, the encryption key can, in some embodiments, be the same key that is used for decryption. The client also receives from a user an identification of an unencrypted data set in a file for encryption (410). Based on that identification, the identified unencrypted data set is encrypted using the received encryption key (415). The encrypted data is then encapsulated as a ciphertext object (420), including the descriptive attributes and other data as described above. A logical or physical link is then created in the file to the location of the ciphertext object (425) and the link stored in the file. The ciphertext object is then stored on a computerized storage device (430).

Figure 5:
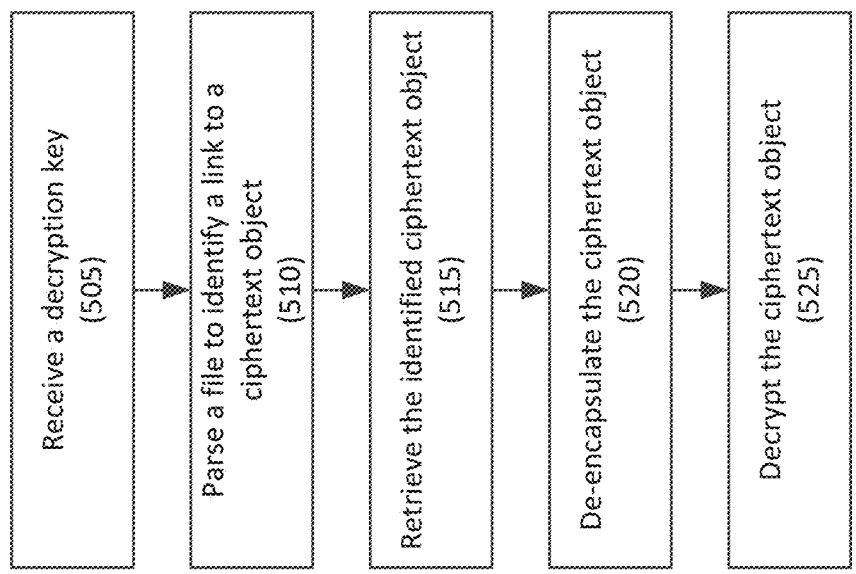
FIG. 5 illustrates an example method for decryption.

A non-limiting example method for decryption is illustrated in FIG. 5. In this example, the client receives a decryption key from a server (505). In some embodiments, as described herein, the key is provided to the user over a secure channel after the user authenticates to the server. The file is parsed to identify one or more physical or logical links to one or more ciphertext objects (510). If a link to a ciphertext object is identified, the ciphertext object can be retrieved from the location identified in the link (515). The ciphertext object can then be de-encapsulated to reveal the ciphertext encryption (520) and the ciphertext can be decrypted using the received key (525).

The invention can include a method for securely encrypting data elements within a stored data container. As used herein, a data container can be a file, a component of a file, a component of a data stream, a class, a data structure, or an abstract data type (ADT) whose instances are collections of other objects. The container can store objects in an organized way that follows specific access rules. The size of the container can depend on the number of objects (elements) it contains. Underlying (inherited) implementations of various container types may vary in size and complexity, and provide flexibility in choosing the right implementation for any given scenario. As non-limiting examples, the data container can be a container, document, email, database, message or video container, or other digital format, or a communications stream.

The system can receive an identification of a data element that exists within a container at a specified location within the container. The data element can be any unit of data defined for processing is a data element; for example, ACCOUNT NUMBER, NAME, ADDRESS and CITY. In some embodiments, the location is a visible location to the user.

The system receives a selection of an encryption profile, wherein the encryption profile maps a group of users with a classification of data, or a group of devices with a classification of data, or a group of users and devices with a classification of data, and wherein the encryption profile specifies an encryption algorithm. The encryption profile can specify a role, as described herein, for a user. In some embodiments, the system can present multiple roles from which a user can select.

The system then copies the identified data to a volatile or non-volatile data store and removes the identified data element from the container. The volatile or non-volatile data store can be system memory. The system then requests an encryption key based on the selected encryption profile, wherein the encryption key is derived based a one-way function that takes as input a master key and a randomly generated salt. The derived encryption key is received and a salt and a random initialization vector are generated.

In the next step, the identified data element is processed to encrypt it according to the derived encryption key and generated initialization vector using the encryption algorithm specified in the encryption profile. The encrypted data is stored in the container in a cipher packet, the cipher packet further comprising the generated salt, initialization vector, and encryption profile.

The cipher packet can be stored in free space of the container using a method that does not alter the native format or protocol of the container and the cipher packet can further comprise redaction item metadata indicating the encryption profile and redaction type. In some embodiments, the cipher packet contains the location in the container where the data element is located.

In some embodiments, the cipher packet can be a data construct containing ciphertext of the data element, a unique salt or identifier, an initialization vector, encryption profile data, wherein the encryption profile data includes Key IDs and versions, integrity and authenticity checking data, wherein the unique salt or identifier is stored in a cloud-based storage facility for tracking.

In some embodiments, the system can be configured to insert a redaction item into the container at the location of the identified data element, wherein the redaction item is selected from one or more of a text phrase or graphical image.

Format Shifting

The document structure described herein enables maintenance of the ciphertext object through file format shifts. Some embodiments can include or interface with program code configured to translate documents from a first format to a second format associated with a second application. This type of functionality is commonly implemented through a "Save As . . . " command. A similar result is achieved when a file is printed as or saved as a PDF. For example, an MS-Word™ document can be saved as a PDF file and the ciphertext object associated with the MS-Word™ document can be preserved in the PDF file.

In a format shift, the encapsulated ciphertext object can be copied into an output file format without being de-encapsulated. At the corresponding location of the protected data set in the input file, the output file can also include a link to the location of the copied ciphertext object. As described above, the ciphertext object can have associated attributes that provide additional contextual information for the ciphertext object and link the ciphertext object to its location in the output file.

As a result, the replacement item for the ciphertext can also be preserved in the second format. The ciphertext object can then be displayed in the second application according to the permissions applied to the role of the user viewing the document.

As described above, the ciphertext object can be a logical structure for storing an encrypted data set. In some embodiments, when an input file of a certain format is stored as an output file in a second format different from the first, the systems and methods described herein can be configured to translate the ciphertext object into the different format to maintain compatibility with the second file format.

In some embodiments, the format shifting functionality can be provided through a plug-in to an existing host application.

Differential Print Functionality

Some embodiments can be configured to enable differential printing capabilities, either through modified host application software or a plug-in for the host application software. For example, in a host application, certain data elements may be encrypted according to a selected encryption profile. As described herein, those data elements may be decrypted and displayed to a user if a user has authenticated to an encryption profile. According to the encryption profile, printing to electronic or physical destinations from the application may be enabled or disabled.

A method of for differential print functionality can be performed by identifying a differential printing permission within the selected encryption profile then, based on the differential printing permission of the encryption profile, determining one or more printing permissions for a data element in the container, wherein the print permission specifies whether a user can print one or more decrypted data elements. If the user does not have print permission to print one or more decrypted data elements, then enabling a document containing the data element to be printed according to the encryption profile, wherein the printed document contains redaction items in place of one or more encrypted data elements. If the user has print permission to print one or more decrypted data elements, then enabling a document containing the data element to be printed according to the encryption profile, wherein the printed document contains at least one data element having been decrypted and revealed according to the corresponding encryption profile.

Data Portability

The cipher packets created, as described herein, can be securely copied between documents on a computing device while a revealed, e.g., decrypted, form of the data is displayed to the user. A user can select a revealed form of a data element, and then the system can identify a cipher packet in the container corresponding to a revealed form of the data element or a redaction item within a container. The system then determines the location of the identified cipher packet in the container in which the identified data element is stored in encrypted form. The contents of the cipher packet can then be copied to a data store, wherein the data store is available to multiple applications in a non-protected shared system memory space. As a non-limiting example, the shared memory space could be a "clipboard" function. In some embodiments, the non-sensitive data element is identified by a selection using a graphical user interface tool.

The system can then insert the identified data element and the cipher packet in a second container, wherein the cipher packet is stored in non-visible free space of the second container using a method that does not alter the native format or protocol of the second container.

In some cases, the selection includes both the revealed form of the data element and information outside of the data element and copying the cipher packet associated with the revealed form of the data element and the information outside of the data element.

In some further embodiments, the identification of a data element can be performed by an automated search functionality based on predefined patterns provided by a user, search tool or artificial intelligence program.

In some embodiments, the system can be configured to insert, at the visible location within the container, an indicator that data has been removed, wherein the data element is a portion of text or graphics, or metadata relating to the container or the contents of the container.

The data container is a container selected from: one or more of word processing or a portable document format, or spreadsheet.

Client Architecture

The client software can be configured to execute on a client computing device. The client computing device can be any form of desktop or mobile computing device. Non-limiting examples include computers running Windows™, MacOS™, iOS™, and Android™ operating systems. The client software can be configured to execute as a stand-alone application or as a plug-in module for an existing file creation application, such as MS-Word™ or Adobe Acrobat™.

In some embodiments, when a document containing a ciphertext object is loaded on a client computing device, instructions executing on the computing device can parse the file to identify the ciphertext objects. If the user has a corresponding decryption key, the encrypted data set will be decrypted and displayed to the user at the appropriate corresponding location in the file. If the user does not have a corresponding key, the encrypted data set will not be displayed and the selected replacement item, if any, will be displayed instead.

Client User Interface

Figure 6:
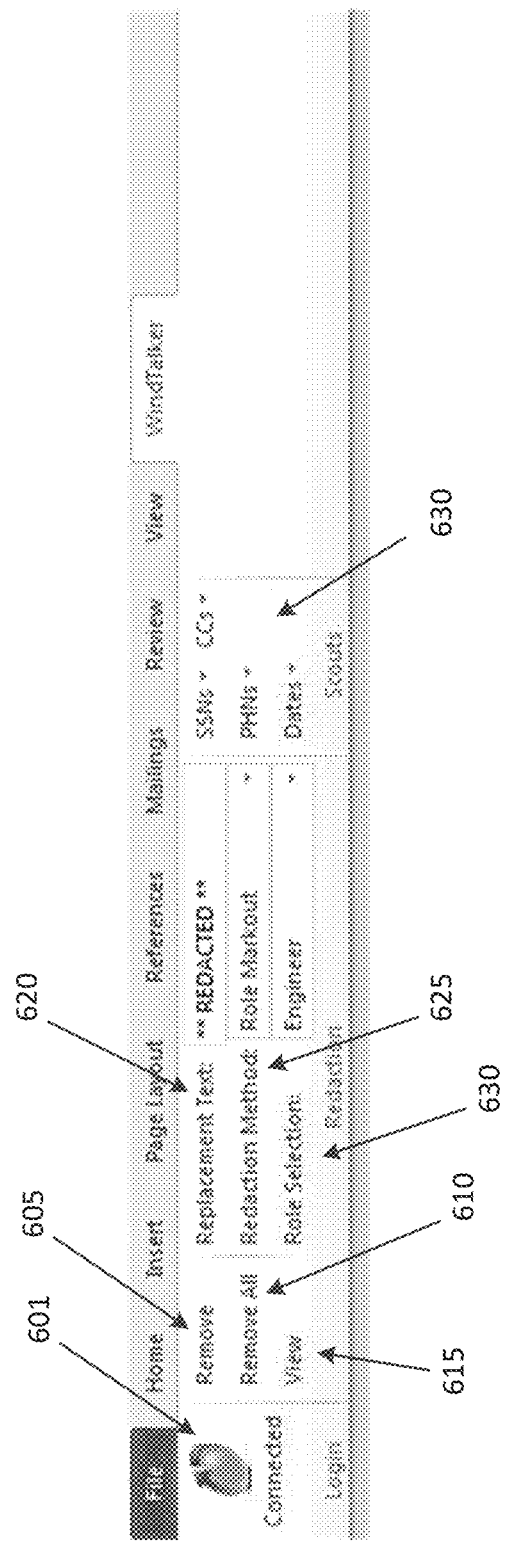
FIG. 6 illustrates an example user interface with commands for encryption and decryption operations.

The client software can be configured to connect to a server, which may be remote or local to the client. As described herein, the client software can be configured with functionality for managing the encryption of portions of a file. A non-limiting example graphical user interface for configuring these options and functions is illustrated in FIG. 6. Non-limiting examples of the functions available in the client software can include connect (601), remove (605), remove all (610), and view (615). The client software can include options for configuring the replacement item (620), redaction method (625), and role selection (630). The client software can also include controls (630) for automatically detecting and encrypting social security numbers, phone numbers, dates, and credit card numbers. The interface can also include a button (601) for executing a login to the management key server.

After the selected unencrypted data set has been identified for encryption, the selected unencrypted data set can be replaced with any of several variable replacement items. In some embodiments, the replacement item can be configured to be a graphical element. As non-limiting examples, the graphical element could be an image area with a defined color and arbitrary shape. As non-limiting examples, replacement items can include black or other colored shapes to indicate that information was redacted, whitespace, tags that include an arbitrary replacement text (e.g., "REDACTED") or other user information in combination with color clues as to what role key was used for the redaction. Other non-limiting examples can include replacement images or markout icons or symbols as are appropriate to the file format being used.

The replacement item could also be any combination of alphanumeric characters, e.g., text. In some embodiments, a control may be provided by which a user can identify a specific replacement text that will be displayed in place of the original unencrypted data set. The replacement text may be defined by a user or selected from a set of predetermined options. The selection of a particular replacement item can be stored in association with the location of the unencrypted data set, as described in more detail above.

Additionally, sensitive information in an unencrypted data set can be removed from its original location, encrypted, and not replaced, thereby rendering protected information invisible and/or undetectable to users viewing the file. The user interface can also include controls for other features.

An unencrypted data set can be marked for encryption by any relevant user action through the user interface. For example, an unencrypted data set can be designated for encryption by selecting the data using an input device. The selected data can then be encrypted by the user issuing a command to protect. In some embodiments, the command to protect can be issued by the user clicking on a graphical element in a graphical user interface. Data can be marked by any selection method appropriate to the data file format and the application operating on that particular file. As non-limiting examples, identification techniques can include highlighting, graphics selection tool marking, selection events (e.g., mouse clicks, etc.), or other graphical user interface driven selection techniques. An example display showing information marked for encryption by highlighting is shown in FIG. 7. In that example, unencrypted data sets marked for redaction according to different role keys are displayed with different corresponding colors.

In some embodiments, the unencrypted data set to be encrypted can be identified by user interaction with a graphical user interface, by pre-determined search, by matching algorithms programmed into software, by user-entered search or matching criteria, by event triggers programmed into software (e.g., system events), and by event triggers triggered by users (e.g., timers, selection event watches). After being identified, the unencrypted data set can be encrypted using any appropriate encryption algorithm. The interface can also provide an option for role selection (630). Roles are described in more detail below. Using the graphical interface, a user can select the current role in which the user is operating.

As illustrated in FIG. 6, the interface can also include commands for remove (605), remove all (610) and view (615). The remove function can be configured to remove the decryption (i.e., permanently decrypt) portions of the encrypted ciphertext object that are currently selected by the user and for which the user has the corresponding decryption key. If no portions of the file are currently selected, the function can be configured to remove all encryption in the encrypted file for the selected user role and for which the user has the corresponding decryption key. The remove all function can be configured to remove all encryption (i.e., decrypt) all encrypted data in the file for all user roles for which the user has the corresponding decryption key(s). In some embodiments, the remove all command can be restricted to remove those redactions only for which the user has been given specified access permissions. The view command can be configured to toggle the displayed view between one of an authenticated user with access to one or more decryption keys, and a second view displaying what would be seen by an unauthenticated user with no access to any keys.

With respect to FIG. 6, it is understood that the labels and particular graphical design used are illustrative only, and that the functions described herein could be performed using a different graphical layout and differently labeled functions.

Figure 8:
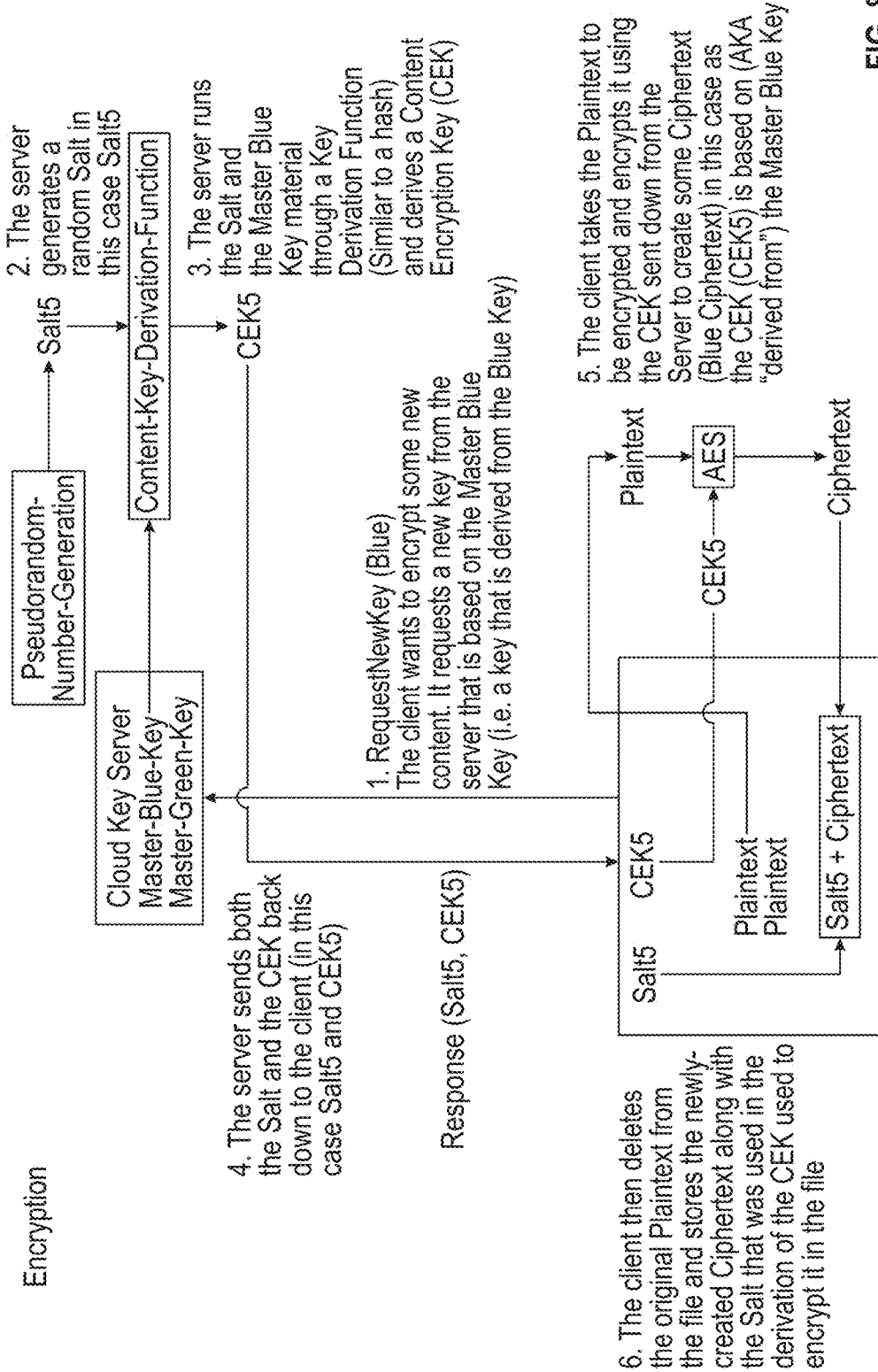
FIG. 8 illustrates an example key generation protocol for encryption.
Figure 9:
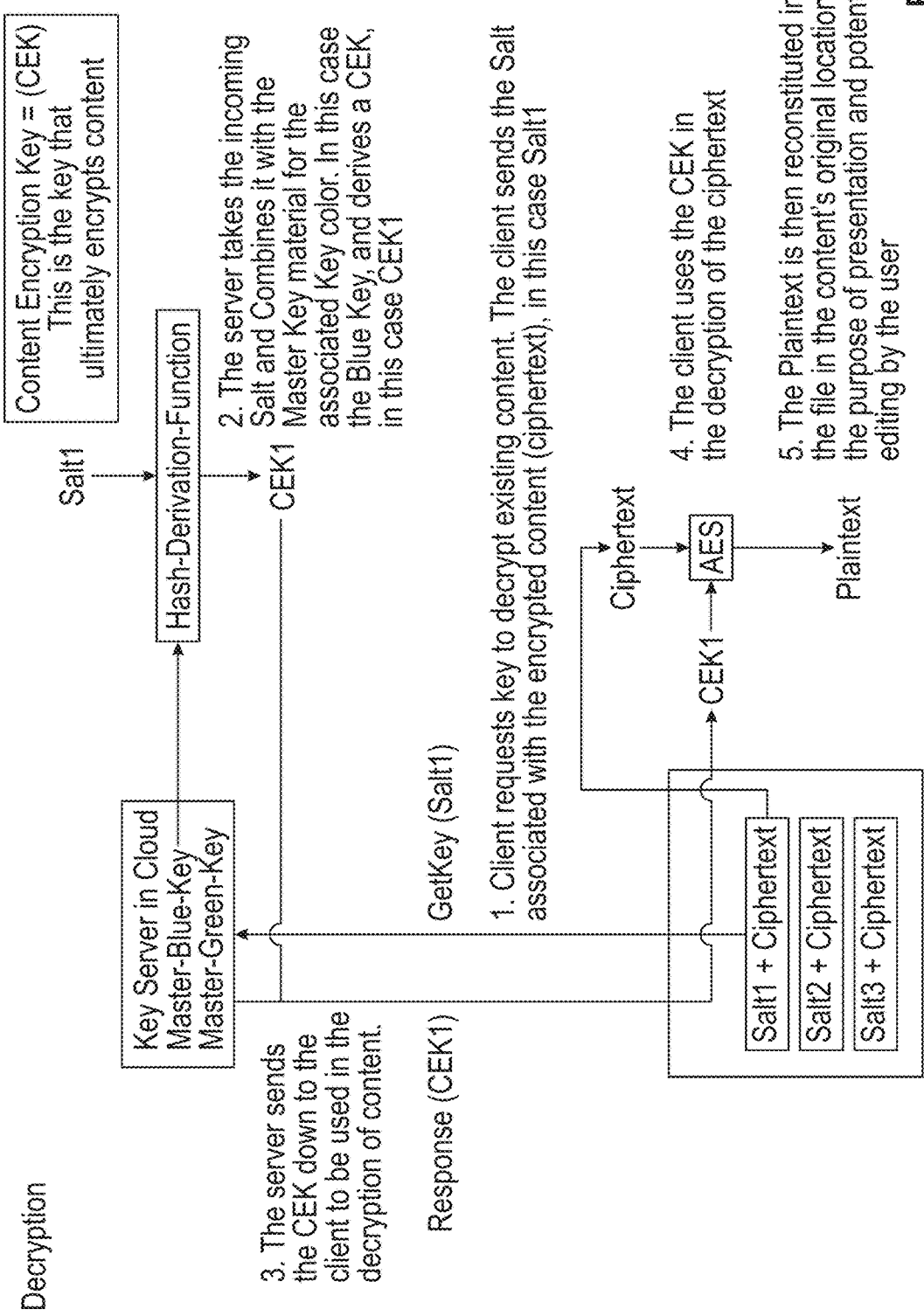
FIG. 9 illustrates an example key generation protocol for decryption.

FIG. 8 illustrates an example key generation protocol for encryption. FIG. 9 illustrates an example key generation protocol for decryption.

Administration

The systems and methods described herein can be implemented using a controller application residing on a computing device designated as an administrator computing device. In some embodiments, the administrator computing device can be a server computer. According to different embodiments, various features can be enabled at the administrator computing device.

Communications between the administrator computing device and a client computing device can be transmitted using standard secure protocols, such as HTTP and HTTPS. In some embodiments, proprietary protocols can be used. Data transferred according to any available protocol may be further securely encapsulated using one or more standard or proprietary techniques. The various devices used can employ connection technology using dual elliptic curve Diffie-Hellman (ECDH) exchanges with advanced protections against man-in-the-middle attacks. Secure connectivity can be used for any or all components of the system. The secure connectivity can be configured to be compatible with existing network security controls (e.g., SSL, TLS, IPSec, VPN, etc.) but does not require compatibility for secure communications. The systems and methods described herein can be used over both secure and insecure networks.

In some embodiments, the administration functionality can be accessed remotely using known secure communication techniques. In some embodiments, the administration computing device can be configured to maintain logs of various actions, such as key requests and authentication attempts.

In some embodiments, an administrator can be provided with authority to grant and/or revoke permissions to any specific encipherment or encryption profile or users. The administration interface can be configured to conceal actual cryptographic key values from any or all users, including any administrators. Thus, an administrator can authenticate to the controller application for the purpose of creating and managing keys and roles, but cannot necessarily inspect the values of any of the keys.

Role Keys and Role Management

Using role-based access security, the systems and methods described herein can be configured so that a single user can be associated with any number of roles. In some embodiments, the roles may be determined by employee function, permissions, or security clearance. For example, a particular user may be able to access information important to that user, without being permitted access to information within the same document for which the user is not authorized.

The systems and methods described herein can be configured to generate one or more role-based keys. Role-based keys (also referred to as role keys) are cryptographic keys that are associated with a role performed in an enterprise. As described herein, the cryptographic key can be of any type, including symmetric, asymmetric, etc. As non-limiting examples, a role can refer to any or all of a job, title, or function, etc. within an organization. Some embodiments do not use roles and, instead, create an architecture whereby a user is assigned one or more keys without associating the user with a role.

As a non-limiting example, a role key can be a data object including some or all of: one or more parameters, a cryptographic key value, and a cryptographic hash value. The system can be configured so that cryptographic key and hash values managed by the key server cannot be viewed by any user or administrator with access to the administration interface.

Multiple role-based keys can be used to encrypt an unencrypted data set within a file, a database, a storage medium, a stream of data, or a system. Thus, a single item (file, database, etc.) may contain multiple ciphertext objects associated with multiple role keys. FIG. 7 illustrates an interface for a text editor wherein some of the unencrypted data sets within the file have been marked for protection. In the illustrated example, "is a tactical" has been marked using a first role key (displayed in green), social security numbers have been marked using a second role key (displayed in pink), and phone numbers have been marked using a third role key (displayed in yellow). As explained herein, if the role functionality is enabled, an individual user may be assigned one or more roles. In the illustrated example, the user can have been assigned three roles.

Role keys can be configured to include some or all of the cryptographic material for deriving additional keys to be used in encryption operations to provide confidentiality and integrity of sensitive information. In addition, role keys may contain other data fields to provide rapid and easily identifiable characteristics to a given role key such as a name and color to be displayed. In those embodiments, the role key initially can be created without reference to any particular user. Thus, an initial instance of a role key can be associated with a role within an enterprise. From that role key, individual keys for individual users associated with that role can be created.

In some embodiments, a given role key can be used to secure different ciphertext objects in different files and across different types of files. As a non-limiting example, an unencrypted data set in three different documents with three different formats can be identified for encryption according to "Role A". Subsequently, some or all users of the system who have been assigned to "Role A" would be provided with a decryption key for the ciphertext objects encrypted for "Role A."

Role management can be performed from a role management console, which may be centralized. Through the management console, any role key can be assigned a display name and/or color and/or any other characteristic.

In some embodiments, role keys can be arranged into one or more tiers in a logical hierarchy. According to the hierarchy, a specially-provisioned user can be allowed to access a key to any position at or below a pre-defined level. In some embodiments, the hierarchy can be represented as a tree structure. A specially-provisioned user can be granted access to keys below that user's level in the hierarchy. In some embodiments, access by a specially-provisioned user can be configured to automatically expire after a pre-configured time period.

A role management console can be provided for maintaining the user base, maintaining client computing device associations, and maintaining role keys.

A non-limiting example system architecture for applying multiple roles and role keys is illustrated in FIG. 1. A user operating a client computing device (110) can generate an authentication request (106) to the key server (105). As described in more detail below, the key server can be configured to store user accounts associated with role information. After verifying the user's credentials, the key server can respond by transmitting to the client the appropriate cryptographic keys associated with that user's role (108). In the illustrated example, the user is credentialed in two roles, role A (120) and role B (130). Based on these credentials, the user is provided with a key corresponding to role A (121) and a key corresponding to role B (131).

Key Server Functionality

A key server can be used by an administrator to grant and revoke access to any ciphertext objects in any document at any time. The ability to decrypt and view any ciphertext object within a document can be granted to or revoked from users on demand from a centralized role management console.

The key server can be configured to provide keys to a user and may be operated as a service. The key server can be any proprietary or commercially-available server configured to authenticate clients and provide responses to key requests. The key server can store data associating users with keys. Once a user is authenticated to the server, the associated key (or keys) may be provided to the user for use in decryption. In some embodiments, users may be authenticated based on a password. In other embodiments, various other parameters can be used for authentication in addition to, or in lieu of, password authentication.

Additionally, as described above, a decryption key can be linked to a role to which a user is assigned. Thus, the key server may be in communication with a role management module and may dispense keys based on authorization information received from the role management module. Alternatively, keys may be provided based on authentication alone, without regard to the user's role, if any.

The key server can be configured to filter access to requested keys. Thus, once a user has authenticated to the key server, additional conditional filters can be applied. Based on the evaluation of those filters, the key server can be configured to grant or deny access to any key. As non-limiting examples, filtering can be performed based on internet protocol (IP) addresses or geo-location. In some embodiments, the key server can be configured to perform IP filtering by whitelisting and/or blacklisting certain IP addresses, subnets, or any other specified range of addresses. In some embodiments, the key server can make certain keys available only within predefined geographical boundaries (e.g., a certain city limit). The filters can be configured to allow control of both whitelisted and blacklisted geo-fences for any given role key or user key. In embodiments with geo-fencing enabled, the key server can receive geographic coordinates reported from a user computing device, such as a mobile device with a GPS. The key server can then be configured to filter based on those received coordinates. In some embodiments, geo-filters can be applied in combination with IP filters or any other specification that can be programmatically evaluated, such as user and/or device credentialing.

In some embodiments, the key server can be configured as a standardized web services application. It can be configured as a standard Web Services Description Language (WSDL) interface. As a non-limiting example, the key server can be configured to run on Microsoft Windows™ Server 2008 R2 or any server of at least comparable functionality. It can be run as a physical machine or as a virtual machine. The key server can operate and store a database of users, computing devices, and roles. As a non-limiting example, the database can be Microsoft™ SQL 2008. This database can also be virtualized, scaled, and/or clustered as needed. As non-limiting examples, the key server can be provided as an enterprise installation or as software as a service (SaaS). The key management database can be configured to support biometric signatures, combinations of biometric-signatures, and/or biometric devices. The key server can also be configured to support multi-factor credentialing.

Key Archive Management

Using an interface provided, an administrator can archive a role key on demand, if, for example, a role key is compromised, assumed to be compromised, or if a security manager wants to alter its value for any reason. This functionality can be made available through a graphical user interface. The process of archiving a role key involves the automatic replacement of its cryptographic value and HMAC value with new values. Subsequently, when a user in the affected role authenticates to the key server, the user can be provided with a new user key, derived from the newly created role key, for use in any new encryption operations.

In some embodiments, when an archived role key is requested, the server can respond by providing two values: the old (archived) value for decryption of previously encrypted data, and the current value for re-encryption of that data. As a result, any document with protected data that was previously encrypted using a subsequently archived key can be updated automatically when an authorized user opens the document. In some embodiments, an automated process can be executed to update the encryption on ciphertext objects in multiple documents throughout a document store.

In some embodiments, key values can be refreshed automatically according to a pre-defined schedule. As non-limiting examples, keys can be scheduled for refreshment and/or archiving on an automatic daily, weekly, monthly, annual or other frequency basis. The refresh frequency can be configured though various management policies. In some embodiments, a time-period for how long archived role keys will be available on the system can be specified. After this period, the system can be configured to store the expiring archived role keys in a vault. Vault storage can be configured to dismount the expired role keys into a file, and render the role keys no longer available. If a vaulted role key is requested by a client application, the return error code can indicate that the requested archived role key has been vaulted. The system can be configured so that the administrator can remount a given role key to be used and then re-vault as desired. These systems and methods enable database size control and security by limiting the number of archived role keys retained on the system.

Securing Web Pages

The systems and methods described herein can be used in connection with delivering secure encrypted content to a user through a web page. One embodiment can include an independent wrapper application that loads a web page internally in the application. In some embodiments, the application could be an in-browser application. In other embodiments, the functionality could be provided through a standardized plug-in to provide the functionality in any browser without requiring an independent wrapper application. As a non-limiting example, partial or entire web pages could be secured by a given role key so that only those users with access to the given role key can view, download or browse to the web pages. In some embodiments, the HTML headers may also be encrypted, in addition to the contents of the web page. This allows the creation of web pages that can be effectively hidden and only accessed by authorized users.

Through the web interface, the client application could be configured to control a number of functions. As non-limiting examples, the functions could include:

1. Login/logout from the key server;
2. Association/determination/ability to allow connection to different key servers (this could be selected by the browsing user or, alternatively, would allow a webpage designer to associate encrypted content with a given key server);
3. Ability to mark a user input on the web page for redaction and then encryption;
4. Redaction and replacement of selected portions of the web page, and storage of ciphertext within the user input field selected;
5. Automatic control of redaction objects in a loaded web page that reveal themselves only if the user and the user's machine are credentialed to access that particular redaction object's contents based on the established permissions of the environment; a
6. Automatic ability to add, edit or remove redaction protection from user input data to the web page based on established permissions on the environment; and
7. Ability to hide or reveal partial or entire web pages or web content objects based on a user's role key access permissions.

In some embodiments, the systems and methods can provide functionality for automatically finding unencrypted data sets to be protected and/or functionality for providing a user interface that enables a user to select input controls to identify the content to be protected.

In some embodiments, the systems and methods can be configured to automatically redact (e.g., encrypt and replace with a replacement item) selected unencrypted data sets according to a selected role key. The web browser environment can be configured to find and automatically display or not display pre-existing protected sections based on the role keys associated with the user.

Securing Video Streams

The systems and methods described herein can be used in connection with securing video content. Video redaction can be performed using the systems and methods described above for files. In some embodiments, video redaction can use a stream mode for encryption, or a stream mode emulation for the encryption. The redactions can occur rapidly to sustain a given frame rate for video or audio or other streaming data signals.

In some embodiments, each frame can be considered an object. Role keys can be used in combination with symmetric cipher algorithms in a stream or stream emulation mode to redact information. As non-limiting examples, different lines of meta-data could be individually encrypted with a different role key, the audio track could use a different role key than the video track, and sections, zones or pixels of a given video frame could be differentially redacted with a different role key. As non-limiting examples, the replacement items can be noise (in the case of audio), or could be pixels of a single color for a given video frame zone, or could be replacement imagery.

In some embodiments, playback and encryption functionality can be provided through a native video or stream application or a plug-in running in another application. Once a user has authenticated to the key server, the user can access only the portions of the data stream for which the user has an available role key.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

A non-limiting example logical system architecture for implementing the disclosed systems and methods is illustrated in FIG. 1. In the illustrated example, a key server (105) can be used to store the keys. The key server may also generate one or more of the key values. In response to an authentication request from a client (106), the key server can transmit the appropriate role key to the client (108). An encryption processor (150) may receive the keys from the key server and the unencrypted data set. In some embodiments, the encryption processor may be part of a computing device operated by user. The encryption processor can be configured to generate a ciphertext based on the key and unencrypted data set.

A decryption processor (150) may subsequently be used to decrypt the ciphertext object. The decryption processor may or may not be part of a computing device operated by a recipient. In some embodiments, the encryption and decryption processors can be incorporated into a mobile device. The decryption processor can receive the ciphertext object from the encryption processor or from any suitable permanent or temporary data store. In some embodiments, such as that depicted in FIG. 1, the decryption processor can be configured to request a corresponding decryption key from the key server. Alternatively, the recipient may receive the key from the key server, bypassing the decryption processor. In that architecture, the recipient could provide both the ciphertext object and the key to the decryption processor. In that embodiment, the key may be stored on a persistent secure storage device accessible to the recipient, such as a smart card. The key can then be used to decrypt the ciphertext object provided to the recipient.

FIG. 1 illustrates a logical arrangement of system elements. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™ C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A computer implemented method implemented using at least one hardware processor, for securely encrypting data elements within a stored data container, the method comprising:
    receiving an identification of a data element that exists within a container at a specified location within the container;
    receiving a selection of an encryption profile, wherein the encryption profile maps a group of users with a classification of data, or a group of devices with a classification of data, or a group of users and devices with a classification of data, and wherein the encryption profile specifies an encryption algorithm;
    copying the identified data to a volatile or non-volatile data store and removing the identified data element from the container;
    requesting an encryption key based on the selected encryption profile, wherein the encryption key is derived based a one-way function that takes as input a master key and a randomly generated salt;
    receiving the derived encryption key and generated salt;
    generating, using by the at least one hardware processor, a random initialization vector;
    processing the identified data element to encrypt it according to the derived encryption key and generated initialization vector using the encryption algorithm specified in the encryption profile;
    storing the encrypted data in the container in a cipher packet, the cipher packet further comprising the generated salt, initialization vector, and encryption profile; and
    wherein the cipher packet is stored in free space of the container using a method that does not alter the native format or protocol of the container;
    wherein the cipher packet further comprises redaction item metadata indicating the encryption profile;
    identifying a cipher packet in the container corresponding to a revealed form of the data element or a redaction item within a container;
    determining the location of the identified cipher packet in the container in which the identified data element is stored in encrypted form;
    copying the contents of the cipher packet to a data store, wherein the data store is available to multiple applications in a non-protected shared system memory space; and
    inserting the identified data element and the cipher packet in a second container, wherein the cipher packet is stored in non-visible free space of the second container using a method that does not alter the native format or protocol of the second container.

2. The method of claim 1, further comprising:
wherein the selection includes both the revealed form of the data element and information outside of the data element; and
copying the cipher packet associated with the revealed form of the data element and the information outside of the data element.

3. The method of claim 1, wherein the identification of a data element is performed by an automated search functionality based on predefined patterns provided by a user, search tool or artificial intelligence program.

4. The method of claim 1, further comprising inserting, at the visible location within the container, an indicator that data has been removed.

5. The method of claim 1, wherein the non-sensitive data element is identified by a selection using a graphical user interface element.

6. The method of claim 1, wherein the data element is a portion of text or graphics, or metadata relating to the container or the contents of the container.

7. The method of claim 1, further comprising presenting multiple roles for a user to select.

8. The method of claim 1, wherein the data container is a container selected from: one or more of word processing or a portable document format, or spreadsheet.

9. The method of claim 1, wherein the data container is a container, document, email, database, message or video container, or other digital format, or a communications stream.

10. The method of claim 1, wherein the cipher packet is a data construct containing ciphertext of the data element, a unique salt or identifier, an initialization vector, encryption profile data, wherein the encryption profile data includes Key IDs and versions, integrity and authenticity checking data, wherein the unique salt or identifier is stored in a cloud-based storage facility for tracking.

11. The method of claim 1, wherein the location is a visible location to the user.

12. The method of claim 1, further comprising inserting a redaction item into the container at the location of the identified data element, wherein the redaction item is selected from one or more of: text phrase or graphical image.

13. The method of claim 1, wherein the cipher packet contains the location in the container where the data element is located.

14. The method of claim 1, further comprising:
identifying a differential printing permission within the selected encryption profile;
based on the differential printing permission of the encryption profile, determining one or more printing permissions for a data element in the container, wherein the print permission specifies whether a user can print one or more decrypted data elements;
if the user does not have print permission to print a one or more decrypted data elements, then enabling a document containing the data element to be printed according to the encryption profile, wherein the printed document contains redaction items in place of one or more encrypted data elements;
if the user has print permission to print one or more decrypted data elements, then enabling a document containing the data element to be printed according to the encryption profile, wherein the printed document contains at least one data element having been decrypted and revealed according to the corresponding encryption profile.

15. A system for securely encrypting data elements within a stored data container, the system comprising:
at least one hardware processor;
a memory;
a plug-in executing at a client device, the plug-in configured for:
receiving an identification of a data element that exists within a container at a specified location within the container;
receiving a selection of an encryption profile, wherein the encryption profile maps a group of users with a classification of data, or a group of devices with a classification of data, or a group of users and devices with a classification of data, and wherein the encryption profile specifies an encryption algorithm;
copying the identified data to a volatile or non-volatile data store and removing the identified data element from the container;
requesting an encryption key based on the selected encryption profile, wherein the encryption key is derived based a one-way function that takes as input a master key and a randomly generated salt;
receiving the derived encryption key and generated salt;
generating a random initialization vector;
processing the identified data element to encrypt it according to the derived encryption key and generated initialization vector using the encryption algorithm specified in the encryption profile; a data store configured for:
storing the encrypted data in the container in a cipher packet, the cipher packet further comprising the generated salt, initialization vector, and encryption profile;
wherein the cipher packet is stored in free space of the container using a method that does not alter the native format or protocol of the container; and
wherein the cipher packet further comprises redaction item metadata indicating the encryption profile;
identifying a cipher packet in the container corresponding to a revealed form of the data element or a redaction item within a container;
determining the location of the identified cipher packet in the container in which the identified data element is stored in encrypted form;
copying the contents of the cipher packet to a data store, wherein the data store is available to multiple applications in a non-protected shared system memory space; and
inserting the identified data element and the cipher packet in a second container, wherein the cipher packet is stored in non-visible free space of the second container using a method that does not alter the native format or protocol of the second container.

16. The system of claim 15, wherein the plug-in is further configured for:
wherein the selection includes both the revealed form of the data element and information outside of the data element; and
copying the cipher packet associated with the revealed form of the data element and the information outside of the data element.

17. The system of claim 15, wherein the identification of a data element is performed by an automated search functionality based on predefined patterns provided by a user, search tool or artificial intelligence program.

18. The system of claim 15, wherein the plug-in is further configured for inserting, at the visible location within the container, an indicator that data has been removed.

19. The system of claim 15, wherein the non-sensitive data element is identified by a selection using a graphical user interface element.

20. The system of claim 15, wherein the data element is a portion of text or graphics, or metadata relating to the container or the contents of the container.

21. The system of claim 15, wherein the plug-in is further configured for presenting multiple roles for a user to select.

22. The system of claim 15, wherein the data container is a container selected from: one or more of word processing or a portable document format, or spreadsheet.

23. The system of claim 15, wherein the data container is a container, document, email, database, message or video container, or other digital format, or a communications stream.

24. The system of claim 15, wherein the cipher packet is a data construct containing ciphertext of the data element, a unique salt or identifier, an initialization vector, encryption profile data, wherein the encryption profile data includes Key IDs and versions, integrity and authenticity checking data, wherein the unique salt or identifier is stored in a cloud-based storage facility for tracking.

25. The system of claim 15, wherein the location is a visible location to the user.

26. The system of claim 15, wherein the plug-in is further configured for inserting a redaction item into the container at the location of the identified data element, wherein the redaction item is selected from one or more of: text phrase or graphical image.

27. The system of claim 15, wherein the cipher packet contains the location in the container where the data element is located.

28. The system of claim 15, wherein the plug-in is further configured for:

- identifying a differential printing permission within the selected encryption profile; based on the differential printing permission of the encryption profile, determining one or more printing permissions for a data element in the container, wherein the print permission specifies whether a user can print one or more decrypted data elements;
- if the user does not have print permission to print a one or more decrypted data elements, then enabling a document containing the data element to be printed according to the encryption profile, wherein the printed document contains redaction items in place of one or more encrypted data elements;
- if the user has print permission to print one or more decrypted data elements, then enabling a document containing the data element to be printed according to the encryption profile, wherein the printed document contains at least one data element having been decrypted and revealed according to the corresponding encryption profile.

* * * * *